(12) United States Patent
Williams

(10) Patent No.: US 8,539,909 B2
(45) Date of Patent: Sep. 24, 2013

(54) APPARATUS FOR SUPPORTING A PET

(76) Inventor: S. Jessica Williams, St. Petersburg, FL (US)

( * ) Notice: Subject to any disclaimer, the term of this patent is extended or adjusted under 35 U.S.C. 154(b) by 93 days.

(21) Appl. No.: 13/214,294

(22) Filed: Aug. 22, 2011

(65) Prior Publication Data

US 2013/0047925 A1   Feb. 28, 2013

(51) Int. Cl.
*A01K 1/035* (2006.01)

(52) U.S. Cl.
USPC ........................................... 119/28.5

(58) Field of Classification Search
USPC ............ 119/28.5, 482, 496, 497, 526; 5/653, 5/420, 727, 728; 29/91.1
See application file for complete search history.

(56) References Cited

U.S. PATENT DOCUMENTS

| | | | | |
|---|---|---|---|---|
| 4,512,286 A * | 4/1985 | Rux | ............................... | 119/771 |
| 4,860,689 A * | 8/1989 | Stewart | .......................... | 119/28.5 |
| 4,930,170 A * | 6/1990 | Kobayashi | ....................... | 5/12.1 |
| 5,487,361 A * | 1/1996 | Dean | ............................ | 119/28.5 |
| 6,363,890 B1 * | 4/2002 | Beck | ............................ | 119/526 |
| 7,694,788 B2 * | 4/2010 | Hann | ................................. | 190/1 |
| 7,921,807 B2 * | 4/2011 | Arvanites | ..................... | 119/28.5 |
| 2011/0239946 A1 * | 10/2011 | Ogle | ............................ | 119/28.5 |

* cited by examiner

Primary Examiner — Rob Swiatek
Assistant Examiner — Ebony Evans
(74) Attorney, Agent, or Firm — Frank Liebenow; Justin Miller; Larson & Larson, P.A.

(57) ABSTRACT

A pet bed having a pet cushion for supporting a pet has a lower cushion for improving comfort when held on one's lap. Between the pet cushion and the lower cushion is an intermediate planar layer made of a stiff material. The pet cushion rests on or is affixed to a top surface of the intermediate planar layer and the top surface of the lower cushion is affixed or removably affixed to a bottom surface of the intermediate layer. When lifting or carrying the pet bed, the intermediate planar layer remains substantially planar, even while a pet rests on the pet surface of the pet cushion.

14 Claims, 3 Drawing Sheets

US 8,539,909 B2

APPARATUS FOR SUPPORTING A PET

FIELD

This invention relates to the field of pets and more particularly to a bed system for a pet that provides comfort and support to both the pet and the pet owner.

BACKGROUND

Many people have pets such as cats and dogs. Some such pets are outdoor pets, spending most of their time outside of the owner's home, perhaps having their own small house in a backyard, etc. Some pets are inside and outside pets, having access to the owner's home, yet going outside for fresh air and to relieve themselves. Some owners provide a pet door, also known as a doggie door, that lets the pet move freely between the indoors and outdoors without any action by the pet owner. Lastly, some pets are indoor pets, spending all of their time within the owner's home.

Many pets, when indoors, have a pet bed. Most pet beds are not much more than a large pillow, usually having a somewhat durable fabric to resist tearing from the pet's nails, etc. Some such pet beds have side walls against which the pet is able to lean against for comfort.

While relaxing, many pet owners enjoy holding their pets on their laps, for example, while they watch television. Having the pet on one's lap or on the furniture (e.g. couch) creates several problems. One problem is shedding. During certain seasons, many pets such as dogs and cats shed some of their hair. This leads to hair getting on the owner's lap and/or furniture. Another problem is dirt, especially for pets that are indoor/outdoor pets. Pets will gather dirt and dust and deposit the dirt and dust on the owner and the furniture. Another problem is heat. Pets are often warm and, during summer months, the warmth makes it uncomfortable for the pet owner to hold them on their laps. Another problem is a sleeping pet. If the pet owner does not want to wake the sleeping pet, it is difficult to move, get up from a seat, change positions, etc. Furthermore, there is less of a need to support the pet with one's hands, thereby freeing both hands for other uses.

The existing pet beds solve some of these issues, but not all of the problems. For example, many pillow-like pet beds will shield the owner and furniture from dirt and hair, but will not sufficiently support the pet to allow the pet owner to lift the pet bed and relocate it while the pet is sleeping. Pet beds of the prior art will bend or fold, waking the pet.

What is needed is a pet bed system that is comfortable for the pet, comfortable for the owner and will allow moving of the pet from one location to another with minimal disturbance of the pet.

SUMMARY

In one embodiment, a pet bed is disclosed including a pet cushion. The pet cushion has a pet surface and a bottom surface. The pet surface provides a surface for supporting a pet. The pet bed also has a lower cushion that has a top surface and a bottom surface. The bottom surface of the lower cushion provides a surface for supporting the pet bed (e.g. on an uneven surface). Between the pet cushion and the lower cushion is an intermediate planar layer. The intermediate planar layer is made of a stiff material. The bottom surface of the pet cushion rests on or is affixed to a top surface of the intermediate planar layer and the top surface of the lower cushion is affixed or removably affixed to a bottom surface of the intermediate layer. When carrying the pet bed, the intermediate planar layer remains substantially planar, even while a pet rests on the pet surface of the pet cushion.

In another embodiment, a pet bed is disclosed including a pet cushion. The pet cushion has a pet surface and a bottom surface. The pet surface provides a surface for supporting a pet. The pet bed also has a lower cushion that has a top surface and a bottom surface. The bottom surface of the lower cushion provides a surface for supporting the pet bed (e.g. on an uneven surface). Between the pet cushion and the lower cushion is a support layer. The support layer is preferably made of a stiff material. The bottom surface of the pet cushion rests on or is affixed to a top surface of the support layer and the top surface of the lower cushion is affixed or removably affixed to a bottom surface of the support layer. When carrying the pet bed, the support layer remains substantially planar, even while a pet rests on the pet surface of the pet cushion.

In another embodiment, a pet bed is disclosed including a pet cushion. The pet cushion has a pet surface and a bottom surface. The pet surface provides a surface for supporting a pet. The pet bed also has a lower cushion that has a top surface and a bottom surface. The bottom surface of the lower cushion provides a surface for supporting the pet bed (e.g. on an uneven surface). Between the pet cushion and the lower cushion is an intermediate planar layer. The intermediate planar layer is made of a stiff material. The bottom surface of the pet cushion rests on or is affixed to a top surface of the intermediate planar layer and the top surface of the lower cushion is affixed or removably affixed to a bottom surface of the intermediate layer. Two handles are affixed to the intermediate planar layer for carrying the pet bed, preferably attached on opposite edges of the intermediate planar layer. When carrying the pet bed, the intermediate planar layer remains substantially planar, even while a pet rests on the pet surface of the pet cushion.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
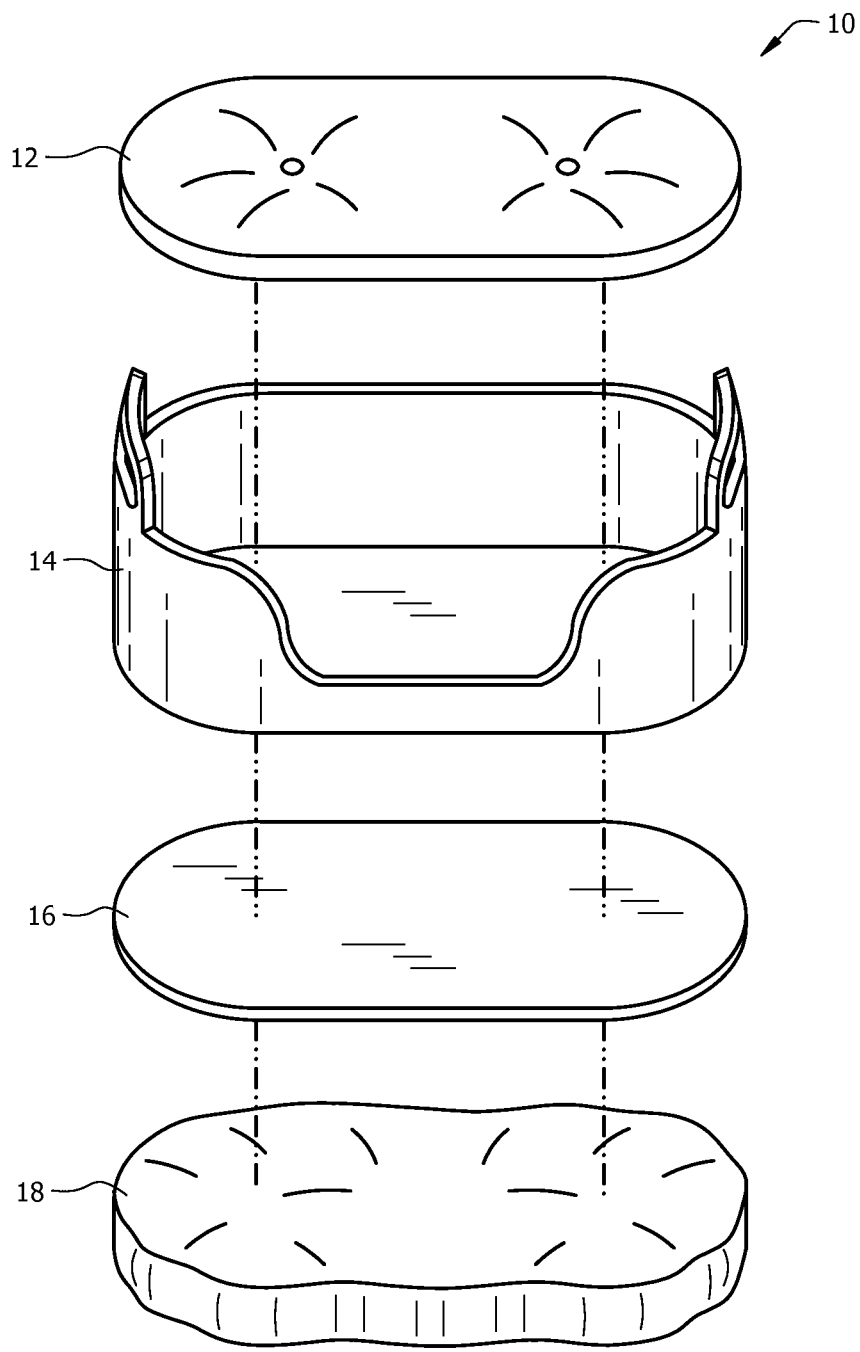
FIG. 1 illustrates an exploded view of a pet bed.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an exploded view of a pet bed 10 is shown. The pet bed includes a pet cushion 12 for providing comfort to a pet 20 (see FIG. 3). The pet cushion 12 has a pet surface on top for holding the pet 20 and a bottom surface. The pet surface of the pet cushion 20 provides a comfortable surface for supporting a pet 20, especially while the pet 20 sleeps.

Figure 5:
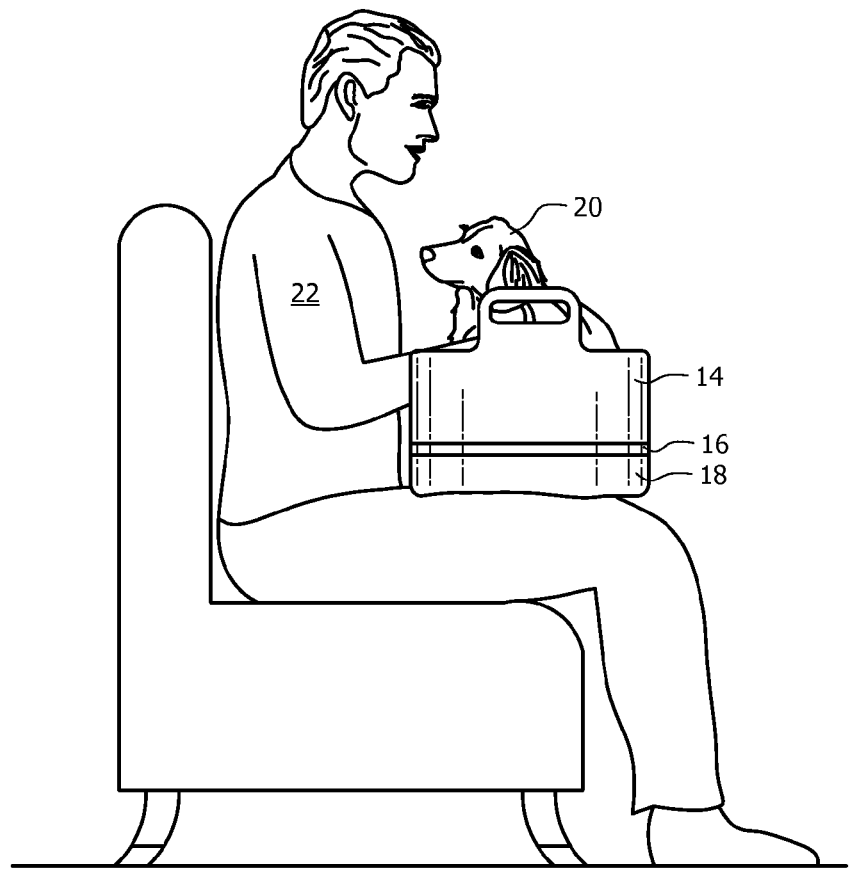
FIG. 5 illustrates a side plan view of the pet bed holding a pet on the lap of a person.

An intermediate planar layer 16 provides support to the pet 20, especially when the pet bed 10 is placed on an uneven surface such as the legs of a person 22 (see FIG. 5). The intermediate planar layer 16 is made of a stiff material such as a stiff plastic, a stiff wood, stiff metal, etc. In some embodiments, the bottom surface of the pet cushion 12 is affixed to a top surface of the intermediate planar layer 16 in ways known in the industry such as with an adhesive. In some embodiments, the bottom surface of the pet cushion 12 is set on the top surface of the intermediate planar layer 16, enabling removal of the pet cushion 12 for cleaning, repair, etc. In such, it is anticipated that a material such as hook and loop material is used to removably fasten the bottom surface of the pet cushion 12 to the intermediate planar layer 16.

A lower cushion 18 is included to improve comfort to the person 22 with the pet bed 10 held on their lap as shown in FIG. 5. A top surface of the lower cushion 18 is affixed to a bottom surface of the intermediate layer 16. In some embodiments, the lower cushion 18 is affixed to the bottom surface of the intermediate layer 16 with, for example, an adhesive such as glue, double sided tape, etc. In some embodiments, the lower cushion 18 is removably affixed to the intermediate layer 16 by, for example, hook and loop material. The bottom surface of the lower cushion 18 provides a surface for supporting the pet bed 10, especially when the pet bed 10 rests on an uneven surface such as the legs of a person 22 (see FIG. 5). The lower cushion 18 provides enhanced comfort to the person 22 who is holding the pet bed 10 on their lap. Any lower cushion 18 is anticipated including, but not limited to, a pillow-type cushion, a bean-bag type cushion, a foam-type cushion, combinations of the former, etc.

Since the intermediate planar layer 16 is stiff, the intermediate planar layer 16 remains substantially planar when carrying the pet bed 10 while a pet 20 rests on the pet surface of the pet cushion 12. In that, being that the intermediate planar layer 16 is made of a stiff material, the intermediate planar layer 16 does not significantly bend when lifted, even under the weight of a pet 20. In contrast, prior pet beds made of a cushion without any stiff member would fold under the weight of most pets 20, making it difficult to lift the bed without disturbing the pet 20. The intermediate planar layer 16 being stiff enables the entire pet bed 10 to be lifted, pet 20 and all, without significant bending, therefore, with minimal disturbance to the pet 20.

The lower cushion 18 provides a cushioned feel to the bottom of the pet bed 10, reducing discomfort for the person 22 who holds the pet bed 10 with a pet 20 on their lap, particularly for long periods of time.

In some embodiments, handles are provided to facilitate lifting the pet bed 10 and relocating it. For example, handles facilitate lifting the pet bed 10 from the lap of the person 22 and to setting the pet bed 10 on a seat or on the floor. When handles 14 are provided, it is preferred that the handles 14 are at opposing ends of the pet bed 10. In some embodiments, the handles 14 include side walls to help contain the pet 20 within the walls.

Figure 2:
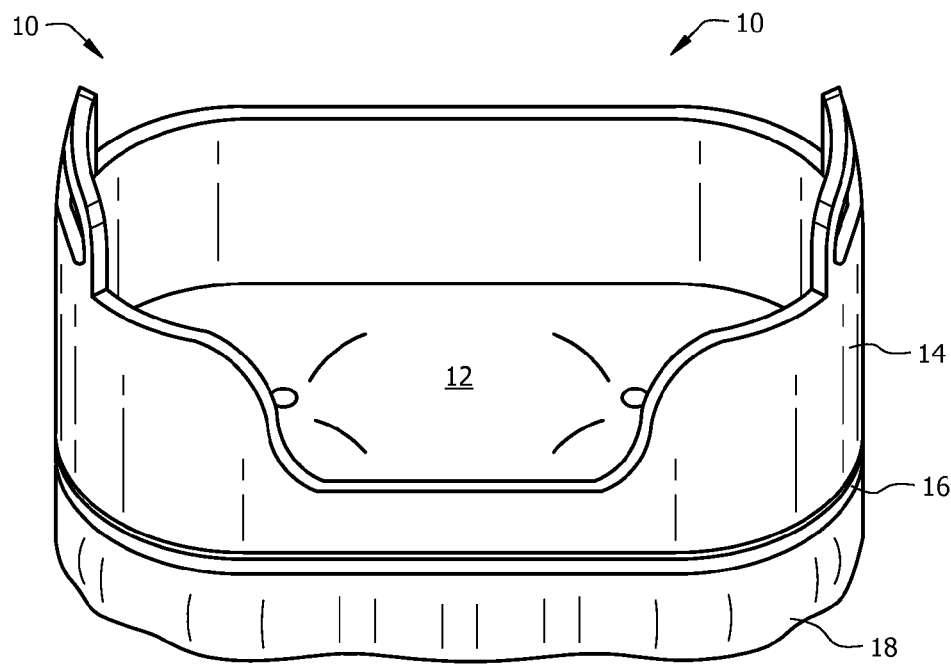
FIG. 2 illustrates a perspective view of the pet bed.

Referring to FIG. 2, a perspective view of the pet bed 10 is shown. In this view, the handles/walls 14 are affixed to the intermediate layer 16 and the pet cushion 12 rests atop or is affixed to the intermediate layer 16. The lower cushion 18 is affixed to the bottom surface of the intermediate layer 16.

Figure 3:
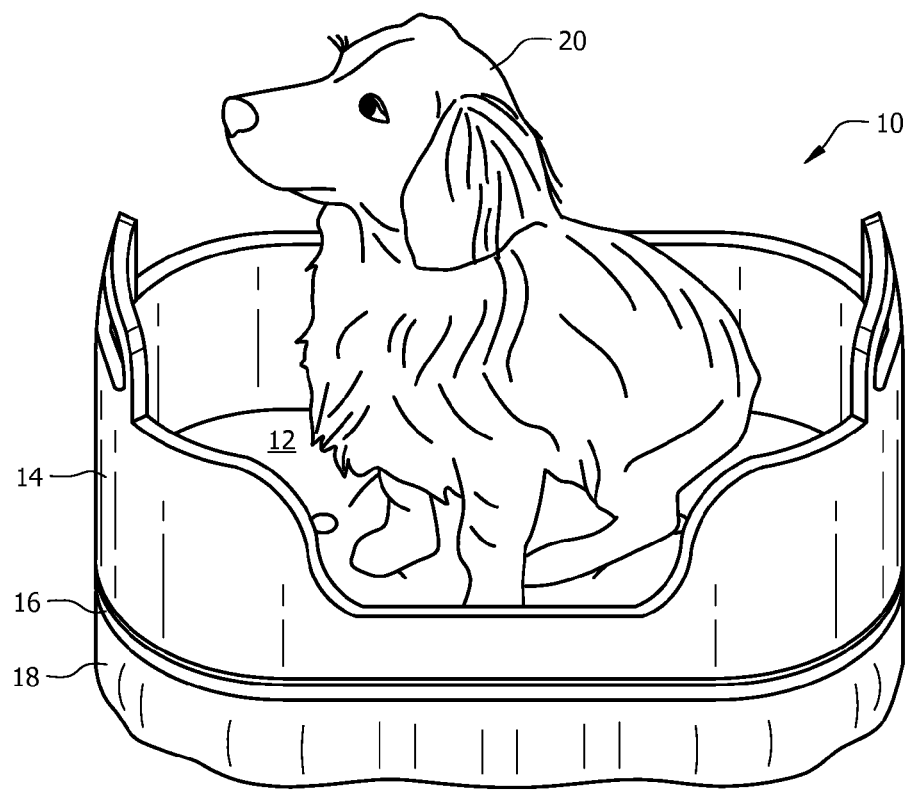
FIG. 3 illustrates a perspective view of the pet bed holding a pet.

Referring to FIG. 3, a perspective view of the pet bed holding a pet is shown. Again, in this view, the handles/walls 14 are affixed to the intermediate layer 16 and the pet cushion 12 rests atop or is affixed to the intermediate layer 16. The lower cushion 18 is affixed to the bottom surface of the intermediate layer 16. In this view, a pet 20 rests atop the pet cushion 12. In such, because of the stiff intermediate layer 16, when the pet bed 10 is lifted, the intermediate layer 16 does not bend substantially, remaining substantially planar, supporting the pet 20 until the pet bed 10 is relocated to a supporting surface.

Figure 4:
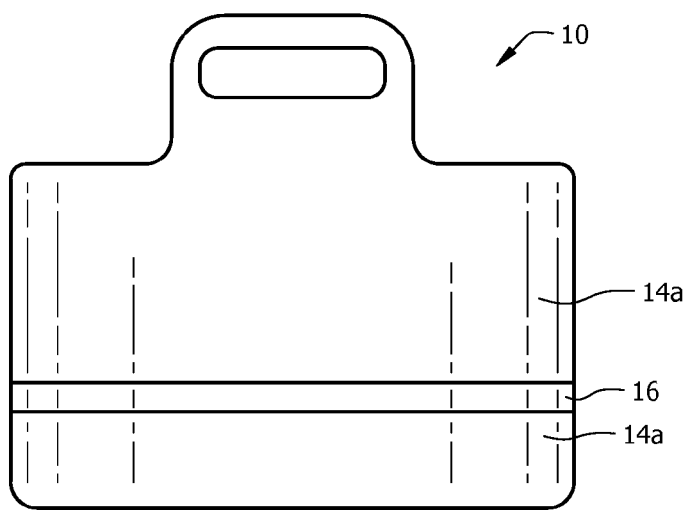
FIG. 4 illustrates a side plan view of the pet bed.

Referring to FIG. 4, a side plan view of the pet bed is shown. In this example, the handles/side walls 14 are made of a stiff material such as a stiff plastic, stiff wood or metal. In this example, the walls 14a continue lower than the intermediate planar layer 16. The lower cushion 18 is not visible, hidden behind the walls 14a. In this, the walls 14a provide a level bottom for supporting the pet bed 10 on a flat surface such as a floor. Still, the lower cushion 18 is positioned beneath the intermediate planar wall 16 for supporting the pet bed 10 on an uneven surface such as the legs of a person 22 as shown in FIG. 5.

Referring to FIG. 5, a side plan view of the pet bed 10 holding a pet on the lap of a person is shown. In this view, the pet bed 10 rests upon legs of a person 22. The lower cushion 18 provides improved comfort to the person 22, especially for heavy pets 20 or when holding the pet bed 10 on one's legs for extended periods of time.

Any shape and size for the pet bed 10 is anticipated. Any materials are anticipated for fabrication as long as the intermediate layer is substantially stiff to provide support when the pet bed 10 is lifted, especially when a pet is situated on the pet bed 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A pet bed comprising:
   a pet cushion, the pet cushion having a pet surface and a bottom surface, the pet surface of the pet cushion providing a surface for supporting a pet;
   a lower cushion, the lower cushion having a top surface and a bottom surface, the bottom surface of the lower cushion providing a surface for supporting the pet bed;
   an intermediate planar layer, the intermediate planar layer being made of a stiff material, the bottom surface of the pet cushion affixed to a top surface of the intermediate planar layer and the top surface of the lower cushion affixed to a bottom surface of the intermediate planar layer; and
   two handles, a first handle of the two handles is affixed to a first area of an outer edge of the intermediate planar layer, a second handle of the two handles affixed to a second area of an outer edge of the intermediate planar layer, the first area being on a distal edge of the intermediate planar layer with respect to the second area, and the two handles continue around a perimeter of the pet cushion, thereby forming walls around the perimeter of the pet cushion;
   wherein the intermediate planar layer remains substantially planar while the pet rests on the pet surface of the pet cushion.

2. The pet bed of claim 1, wherein the first handle of the two handles affixed to a first area of the outer edge of the intermediate planar layer, the second handle of the two handles affixed to a second area of the outer edge of the intermediate planar layer, the first area being on a distal edge of the intermediate planar layer with respect to the second area.

3. The pet bed of claim 1, wherein the intermediate planar layer is made of a material selected from a group consisting of a stiff planar sheet of plastic, a planar sheet of wood, and a planar sheet of metal.

4. The pet bed of claim 1, wherein the pet cushion is a pillow.

5. The pet bed of claim 1, wherein the lower cushion is a pillow.

6. The pet bed of claim 1, wherein the lower cushion is removably affixed to the intermediate planar layer by hook and loop material.

7. A pet bed comprising:
   a pet cushion, the pet cushion having a pet surface and a bottom surface, the pet surface of the pet cushion providing a surface for supporting a pet;
   a lower cushion, the lower cushion having a top surface and a bottom surface, the bottom surface of the lower cushion providing a surface for supporting the pet bed; and
   means for supporting the pet cushion, the bottom surface of the pet cushion affixed to a top surface of the means for supporting and the top surface of the lower cushion affixed to a bottom surface of the means for supporting;
   wherein the means for supporting remains substantially planar when carrying the pet bed with a pet resting on the pet surface of the pet cushion; and
   two handles, a first handle of the two handles affixed to a first area of an outer edge of the means for supporting, a second handle of the two handles affixed to a second area of the outer edge of the means for supporting, the first area being on a distal edge of the means for supporting with respect to the second area and the two handles continue around a perimeter of the pet cushion thereby forming walls around the perimeter of the pet cushion.

8. The pet bed of claim 7, wherein the means for supporting is a stiff, intermediate planar layer.

9. The pet bed of claim 8, wherein the intermediate planar layer is made of a material selected from a group consisting of a stiff planar sheet of plastic, a planar sheet of wood and a planar sheet of metal.

10. The pet bed of claim 7, wherein the pet cushion is a pillow.

11. The pet bed of claim 7, wherein the lower cushion is a pillow.

12. The pet bed of claim 7, wherein the lower cushion is a pillow and the pillow is attached to the means for supporting with hook and loop material.

13. A pet bed comprising:
   a pet cushion, the pet cushion having a pet surface and a bottom surface, the pet surface of the pet cushion providing a surface for supporting a pet;
   a lower cushion, the lower cushion having a top surface and a bottom surface, the bottom surface of the lower cushion providing a surface for supporting the pet bed;
   an intermediate planar layer, the intermediate planar layer being made of a stiff material, the bottom surface of the pet cushion affixed to a top surface of the intermediate planar layer and the top surface of the lower cushion affixed to a bottom surface of the intermediate planar layer;
   two handles, a first handle of the two handles affixed to a first area of an outer edge of the intermediate planar layer, a second handle of the two handles affixed to a second area of the outer edge of the intermediate planar layer, the first area being on a distal edge of the intermediate planar layer with respect to the second area;
   walls around a perimeter of the pet cushion, the walls affixed to the intermediate planar layer;
   wherein the intermediate planar layer substantially remains planar when carrying the pet bed while a pet rests on the pet surface of the pet cushion.

14. The pet bed of claim 13, wherein the intermediate planar layer is made of a material selected from a group consisting of a stiff planar sheet of plastic, a planar sheet of wood and a planar sheet of metal.

\* \* \* \* \*